United States Patent
Mechling, IV

[11] Patent Number: 6,122,852
[45] Date of Patent: Sep. 26, 2000

[54] ICE FISHING LURE TRANSPORT

[76] Inventor: Robert Mechling, IV, P.O. Box 7204, Marquette, Mich. 49855

[21] Appl. No.: 09/112,558

[22] Filed: Jul. 9, 1998

[51] Int. Cl.[7] .................................................. A01K 97/01
[52] U.S. Cl. ................................. 43/4; 43/26.1; 43/43.13
[58] Field of Search ............................... 43/4, 4.5, 26.1, 43/43.1, 43.11, 43.13; 440/36; 446/162, 454, 456; 405/61; 180/164

[56] References Cited

U.S. PATENT DOCUMENTS

| | | | |
|---|---|---|---|
| 798,344 | 8/1905 | Holz et al. | 43/26.1 |
| 2,327,012 | 8/1943 | Bright | 114/222 |
| 2,420,451 | 5/1947 | Spenard | 43/26.1 |
| 2,693,047 | 11/1954 | Lumsden | 43/26.1 |
| 2,726,471 | 12/1955 | Uus | 43/17.5 |
| 2,803,914 | 8/1957 | Ellis | 43/26.1 |
| 2,823,635 | 2/1958 | Hagemann | 43/43.1 |
| 2,845,742 | 8/1958 | Skillman | 43/26.2 |
| 2,904,919 | 9/1959 | Long | 43/4 |
| 3,001,313 | 9/1961 | Long | 43/4 |
| 3,007,432 | 11/1961 | Still | 43/26.1 |
| 3,106,796 | 10/1963 | Friedland | 43/26.1 |
| 3,149,435 | 9/1964 | Nordeen | 43/43.11 |
| 3,168,789 | 2/1965 | Gednalske | 43/19.2 |
| 3,481,064 | 12/1969 | Newman | 43/4 |
| 3,568,454 | 3/1971 | Itami | 405/190 |
| 3,599,370 | 8/1971 | Armata et al. | 43/26.1 |
| 3,613,284 | 10/1971 | Anderson | 43/26.1 |
| 3,709,184 | 1/1973 | Laney | 114/222 |
| 4,157,229 | 6/1979 | Kumm | 405/185 |
| 4,270,307 | 6/1981 | Arigaya | 446/456 |
| 4,508,516 | 4/1985 | D'Andrade et al. | 446/454 |
| 4,642,932 | 2/1987 | Austin | 43/4 |
| 4,757,633 | 7/1988 | Van Cleve | 43/26.1 |
| 4,826,353 | 5/1989 | Statham | 405/61 |
| 4,856,222 | 8/1989 | Hannam | 43/26.1 |
| 5,016,385 | 5/1991 | Blease | 43/26.1 |
| 5,154,016 | 10/1992 | Fedora et al. | 43/26.1 |
| 5,201,884 | 4/1993 | Nicholas | 43/26.1 |
| 5,273,480 | 12/1993 | Suto | 446/456 |
| 5,293,712 | 3/1994 | Lo | 43/26.1 |
| 5,577,154 | 11/1996 | Orton | 446/456 |
| 5,722,872 | 3/1998 | Simmons et al. | 446/456 |
| 5,785,576 | 7/1998 | Belton | 446/456 |
| 5,829,184 | 11/1998 | Studanski | 43/43.13 |
| 5,867,932 | 2/1999 | Reiger | 43/43.13 |

FOREIGN PATENT DOCUMENTS

| | | | |
|---|---|---|---|
| 1028737 | 3/1978 | Canada | 43/4 |
| 318685 | 10/1902 | France | 43/26.1 |
| 5-95750 | 4/1993 | Japan | 43/26.1 |
| 195777 | 10/1967 | U.S.S.R. | 43/26.1 |
| 852299 | 8/1981 | U.S.S.R. | 43/4 |

Primary Examiner—Michael J. Carone
Assistant Examiner—Darren W. Ark
Attorney, Agent, or Firm—Waters & Morse, P.C.

[57] ABSTRACT

The ice fishing device is useful to place a fishing lure away from an ice fishing hole, under the ice. The device includes a float that provides buoyancy and urges the device upward when the device is placed in a body of water; a drive that has forward and backward modes and propels the device in opposing forward and backward directions; a power source operatively connected with the drive; a control operatively connected with the drive; and a coupler that releasably couples with a lure. The device may further include a slide member that abuts the ice in sliding engagement and slides the device over topographical irregularities of the ice. The device may further include a monitor to provide information regarding such conditions as water depth temperature, position, and fish location. The control may further be connected with the drive by a tether that has multiple electrical conductors, or by a wireless transmitter and receiver system. The tether may also be constructed to float when placed in water. The drive may include a motor and a propeller connected with the motor. The propeller may be one of a wheel, a track, and a screw propeller. The propeller may also include two spaced apart members that abut the bottom surface of the ice in friction engagement. The drive may activate the two members independently or in unison.

20 Claims, 5 Drawing Sheets

ICE FISHING LURE TRANSPORT

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to fishing, and more particularly to ice fishing and the placement of a fishing lure under a body of ice that is disposed upon a body of water.

Ice fishing is a commonly known and widely enjoyed winter sport. Ice fishing participants will commonly drill several holes in the ice upon a frozen lake, and fish in the various holes to cover a larger fishing area of the lake than one may conventionally cover through only one hole. Anyone may appreciate that drilling a hole in the ice of a frozen lake is a difficult task that requires significant effort. One may, therefore, appreciate a need for a device that will expand the fishing area coverage afforded through only one hole in the ice, rather than the common practice of drilling multiple holes to cover a given fishing area.

Unfortunately, the report of ice fishing accidents because of thin ice at the beginning and the end of a winter season, is too common of an occurrence. Thus, one may also appreciate the need from a safety perspective of a device that facilitates ice fishing, without requiring fishermen to venture out onto the ice, especially when the ice is too thin to support the fisherman.

BRIEF SUMMARY OF THE INVENTION

An ice fishing lure placement device according to the invention addresses the concerns noted above and provides expanded coverage of a fishing area from an ice fishing hole by transporting, or carrying, a fishing lure out, away from the ice fishing hole. Further, an ice fishing device according to the invention allows fishermen to stay at the water's edge and send a fishing lure out, away from the shore, without the fisherman venturing upon thin ice.

The device includes a float that provides buoyancy and urges the device upward when the device is placed in a body of water; a drive that has forward and backward modes and propels the device in opposing forward and backward directions; a power source operatively connected with the drive; a control operatively connected with the drive; and a coupler that releasably couples with a lure. In one aspect of the invention, the device may further include a slide member that abuts the ice in sliding engagement and slides the device over topographical irregularities of the ice. In another aspect of invention, the device may further include a monitor to provide information regarding such conditions as water depth temperature, position, and fish location.

In further aspects of the invention, the control may be connected with the drive by a tether that has multiple electrical conductors, or by a wireless transmitter and receiver system. Further, the tether may be constructed to float when placed in water.

In other aspects of the invention, the drive includes a motor and a propeller connected with the motor. The propeller may be one of a wheel, a track, and a screw propeller. Further, the propeller may include two spaced apart members that abut the bottom surface of the ice in friction engagement. The drive may activate the two members independently or in unison.

These and other features, objects, and benefits of the invention will be recognized by one having ordinary skill in the art and by those who practice the invention, from the specification, the claims, and the drawing figures.

DETAILED DESCRIPTION OF THE INVENTION

Figure 1:
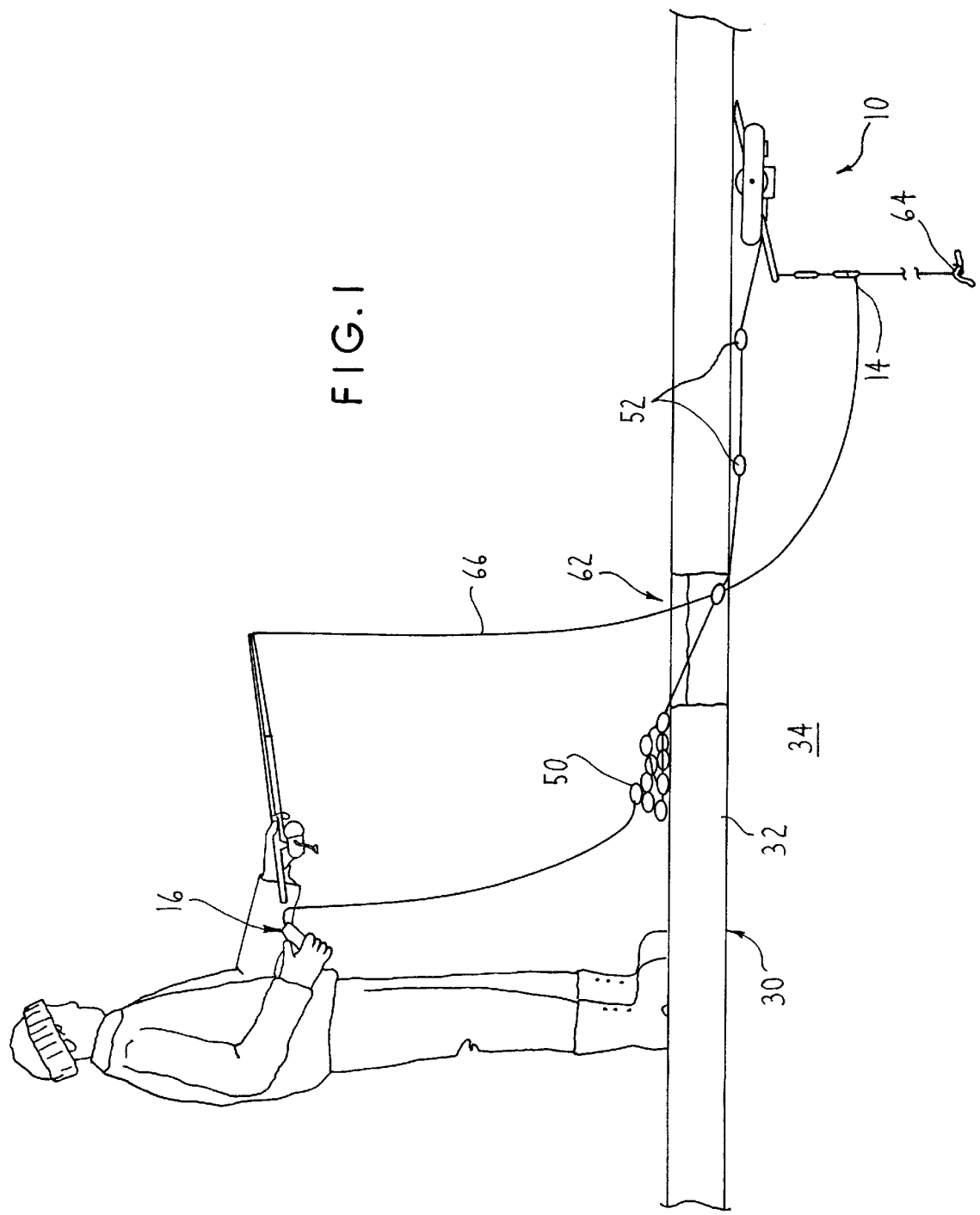
FIG. 1 is a fragmentary elevational view showing an ice fishing device according to the invention in use.
Figure 2:
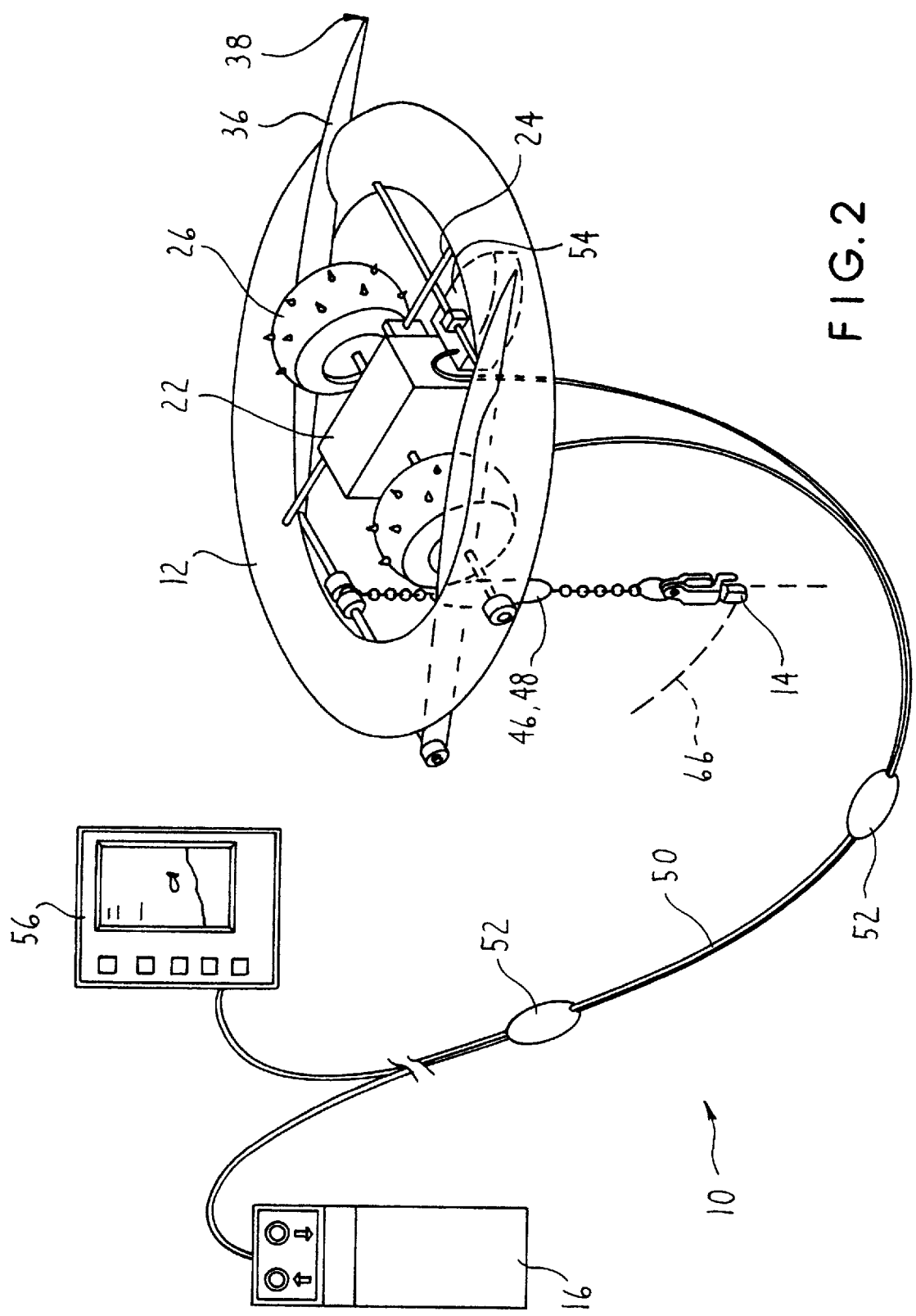
FIG. 2 is a perspective view of the ice fishing device of FIG. 1.
Figure 3:
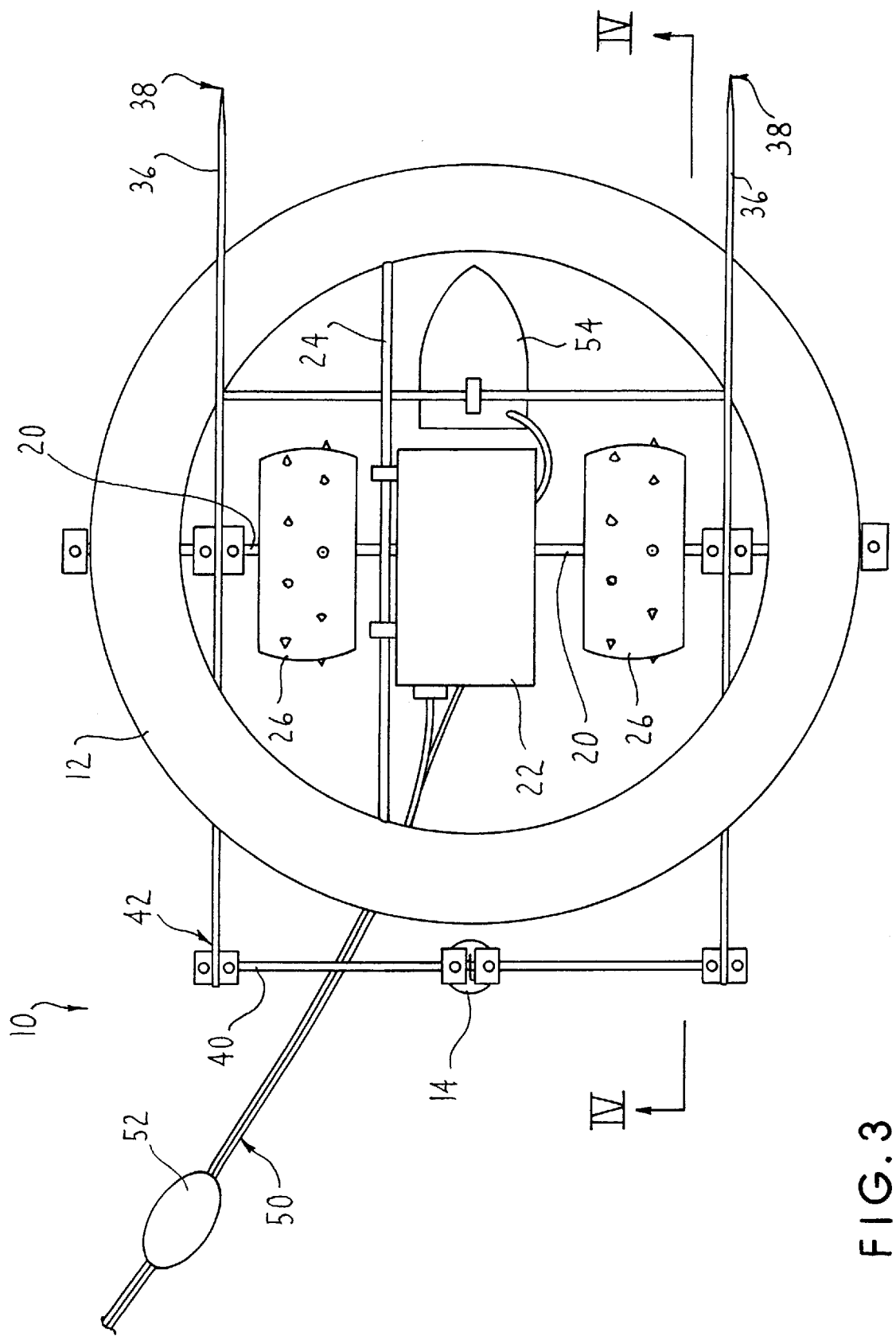
FIG. 3 is a top plan view thereof.
Figure 4:
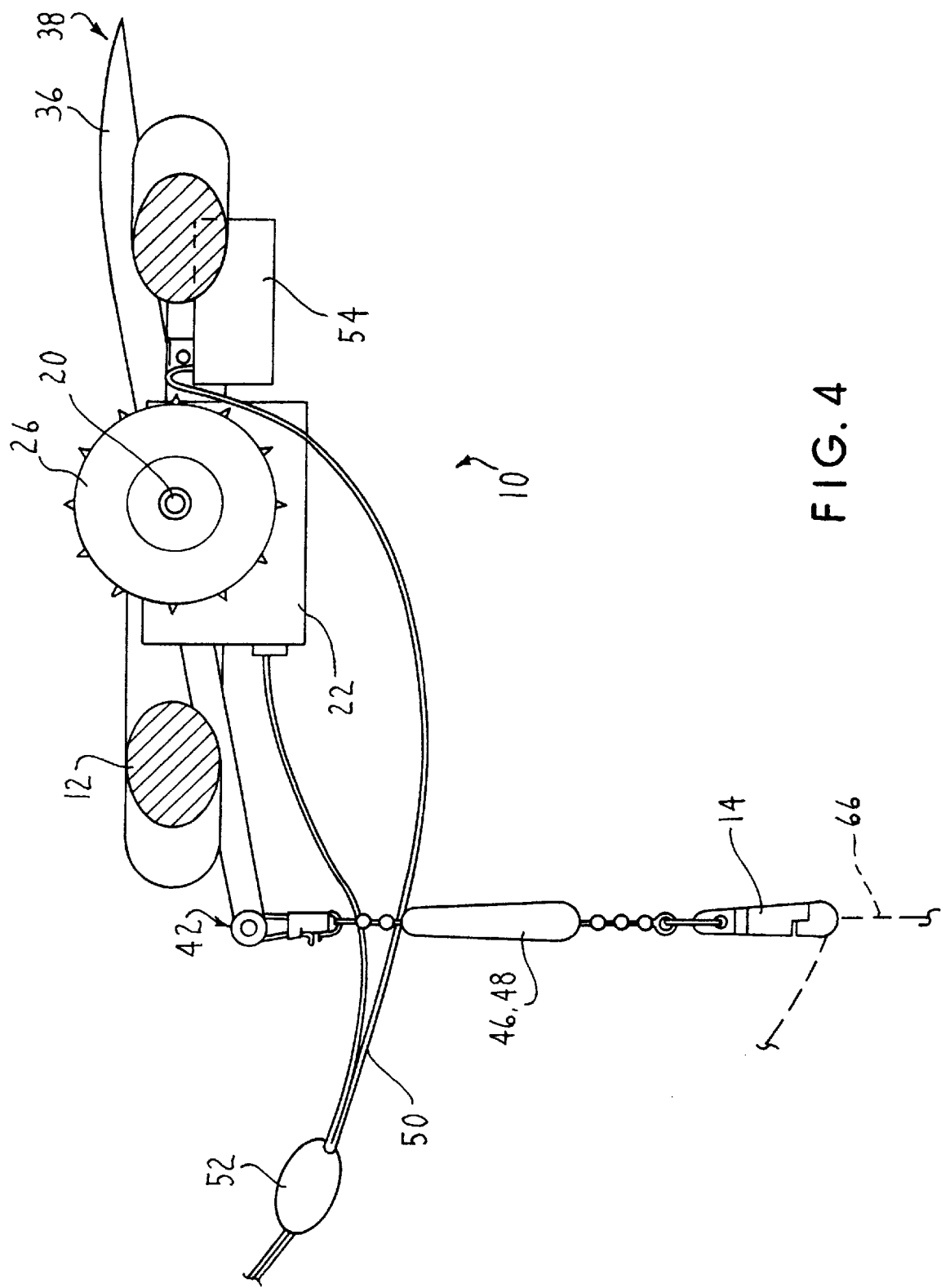
FIG. 4 is a longitudinal cross-sectional view thereof, taken along section line IV—IV of FIG. 3.

A preferred embodiment of an ice fishing lure placement device 10 according to the invention is generally shown in the drawing FIGS. 1–4. The device 10 has a float 12, a drive, a releasable lure coupler 14, and a control 16.

The float 12 may be a separate member that is connected with a structural support frame of the device, or may be an integral portion of the frame. As is shown in the drawing figures, the float 12 provides a portion of the frame of the device. More specifically, the float 12 may be an annular ring of a flotation material. An annular ring of foam, having a generally circular cross section, an inner diameter of about five inches (127 mm), and an outer diameter of about eight inches (203 mm), for example, has proven satisfactory. One having ordinary skill in the art will realize that various engineering materials may be used to construct the float 12, and that the float may be constructed with any of various configurations, according to a user's or manufacturer's design preferences. The numerous alternative constructions of the float may include, without limitation, blow molding or rotational molding a hollow chamber plastic float, for example.

An axle 20 (FIG. 3) may extend diametrically through the float 12 and provide both a rotary drive axle and a structural frame member. A drive that has a motor 22 and a propeller, is connected with the frame and operatively connected to rotate the axle 20. The motor 22 is preferably a low voltage direct current motor to provide the shock safety to a user of low voltage, and to facilitate forward and reverse driving modes. Further the motor 22 may be connected with the axle 20 through a reduction gear, as is commonly known. As shown, a cross rod 24 (FIG. 3) may be included in the frame to anchor the motor 22 and provide stability to the motor, so the motor does not rotate relative to the lure placement device 10, rather than the motor 22 rotating the axle 20 relative to the device 10.

The propeller most preferably includes a pair of spaced apart studded wheels 26 that engage a bottom surface 30 (FIG. 1) of a body of ice 32 that is disposed upon a body of water 34. The wheels 26 are operatively connected with the axle 20 to rotate with the axle, and abut the ice 32 in friction engagement to drive the device 10 across the bottom surface 30 when the lure placement device 10 is placed under the ice 32. More specifically wheels 26 having a diameter of about one and three-quarters inches (45 mm) work well with the float 12 specified above. One having ordinary skill in the art will understand that the propeller may also include a single wheel or a track arrangement, for example. These alternative arrangements may include complications, however. For example, the propeller could alternatively include the use of a conventional screw propeller that induces a stream of water to create thrust and propel the device 10. One having ordinary skill in the art will appreciate, however, that a screw propeller is more likely to become entangled with a tether that may be used with the device 10 or with a fishing line.

The pair of spaced drive wheels 26 as shown provides directional stability to the device 10, when traversing the bottom 30 of a body of ice 32. The ice bottom 30 may, however, have a variety of topographic irregularities. Thus, a ski 36, and more preferably a pair of skis 36, are used to slide the device 10 over surface irregularities. The skis 36 also enhance directional tracking of the device 10 by providing a directional tracking member or ice engaging rudder for the device 10. More specifically, for the float 12 specified above, generally knife-like skis 36 that are about nine inches (229 mm) long, with an about three-quarter inch (19 mm) depth, may be pivoted upon the drive axle 20 at a location about five and a half inches (140 mm) from a leading tip 38 of the skis. The skis 36 may be constructed from various engineering materials, using various methods, as will be understood by one having ordinary skill in the art. The skis may be constructed as knife-like members that are stamped out of stainless steel or are a plastic molding, for example.

A spacing member 40 is connected between the skis 36, at either of the ski ends, to keep the skis generally parallel. By positioning the spacer at the trailing end 42 of the skis 36, however, the skis are not stiffly locked together rotatably, but are allowed to skim over surface irregularities with some independence. Placement of the spacer 40 at the trailing end 42 of the skis 36 also provides a convenient hanger for the lure coupler 14. Although, the lure coupler may also be attached to the frame, including the float 12, for example.

The lure coupler 14 is a line release coupler that is a commonly known item of fishing tackle that may typically be used with down riggers and the like. Further, the lure coupler 14 is most preferably connected with the spacer 40 by a swivel connector 46. The swivel connector 46 may include an about one and a quarter ounce weight 48 to position the coupler 14 generally below the lure placement device 10. The weight 48 also biases the skis 36 toward engagement with the ice bottom surface 30.

The controller 16 may be a hand held device that is most preferably coupled with the motor 22 by a multi-conductor wire tether 50 for electrical control of the lure placement device 10 as will be understood by one having ordinary skill in the art. The tether 50 is also most preferably a sturdy flexible member that is designed not only for electrical control connection with the lure placement device 10, but also provides a retrieval line for the device 10. An array of spaced tether floats 52 may be provided along the tether 50 to assure flotation of the tether and minmize a potential for entanglement of the tether and a fishing line, as is discussed further below. The tether 50 may alternatively be constructed as an inherently floating cable, so the tether floats 52 would not be needed.

The controller 16 may alternatively be operatively coupled with the motor 22 by a wireless connection as is commonly known and understood by one having ordinary skill in the art, especially regarding remote controlled model cars, and like. The use of the tether 50 has apparent benefit for retrieving the lure placement device 10, however, when drive power is lost or when the device 10 becomes misdirected away from a user, for example. If all else fails the user may retrieve the device 10 by merely pulling in the tether. Further, use of a tethered controller 16 allows an electrical power source to be located at the controller with no need to also provide a power source at the motor 22.

At a minimum, the controller 16 provides user control to activate the motor in opposing forward and reverse modes to move the lure placement device 10 away from and toward the user, respectively. With such minimal motion control, the axle 20 is preferably a solid axle arrangement, so the wheels turn in unison. Alternatively, the drive and controller 16 may provide for independent control of the two wheels 26 for skid-steer motion control of the device 10 as will be understood by one having ordinary skill in the art. With skid-steer motion control, the controller 16 provides independent control of each drive wheel 26, and the drive is responsive to the controller with independent actuation of each drive wheel 26.

Optional instrumentation 54 may be provided for the lure placement device 10, either as an independent, added system, or integrally incorporated into the device 10. Such instrumentation may include a depth sounder or a fish finder with a transducer 54 mounted on the frame of the lure placement device 10, or may include a locator beacon mounted on the frame of the lure placement device 10, for example. A control or display 56 of the instrumentation 54 and the device control 16 may optionally be integrated into a single unit to enhance use and minimize equipment clutter. Further, the tether 50 may optionally include a sufficient number of conductors to support operation of the instrumentation 54 and further enhance use and minimize equipment clutter.

In use, an ice fishing hole 60 is prepared in a conventional manner and conventional ice fishing tackle, including a lure 64, is also prepared. The lure placement device 10 is positioned next to the fishing hole 60 and the tether 50 is positioned for tangle free feeding through the hole. A preselected length of fishing line 66 is measured out and the line is releasably coupled with the lure coupler 14. The lure 64 and device 10 are passed through the hole 60 and into the water 34. The device is positioned against the bottom 30 of the ice 32 with the skis 36 pointed toward a desired fishing location. By manipulation of the control 16, a user may drive the device 10 away from the hole 60, to the desired fishing location. Conversely, the device 10 may also be driven back to the hole 60.

When the lure placement device 10 is driven away from the hole 60, the tether 50 and the fishing line 66 are fed out to follow the device 10. The floats 52 keep the tether 50 up against the ice bottom 30 to minmize entanglement of the tether and the fishing line 66. When a fish is hooked, the coupler 14 releases the fishing line 66 and the fish may be retrieved by the fisherman, unencumbered by the lure placement device 10, including the tether 50, which are positioned out of the way, against the ice bottom 30.

Similarly, thin ice situations may also be fished. The fisherman remains at the shore or at least in shallow water, with the use of boots or waders or the like, and uses the lure placement device 10 under the thin ice. A fishing lure 64 may be driven out with the device 10 to a desired fishing location under the thin ice. The fisherman is allowed to fish without risk of breaking through thin ice.

Figure 5:
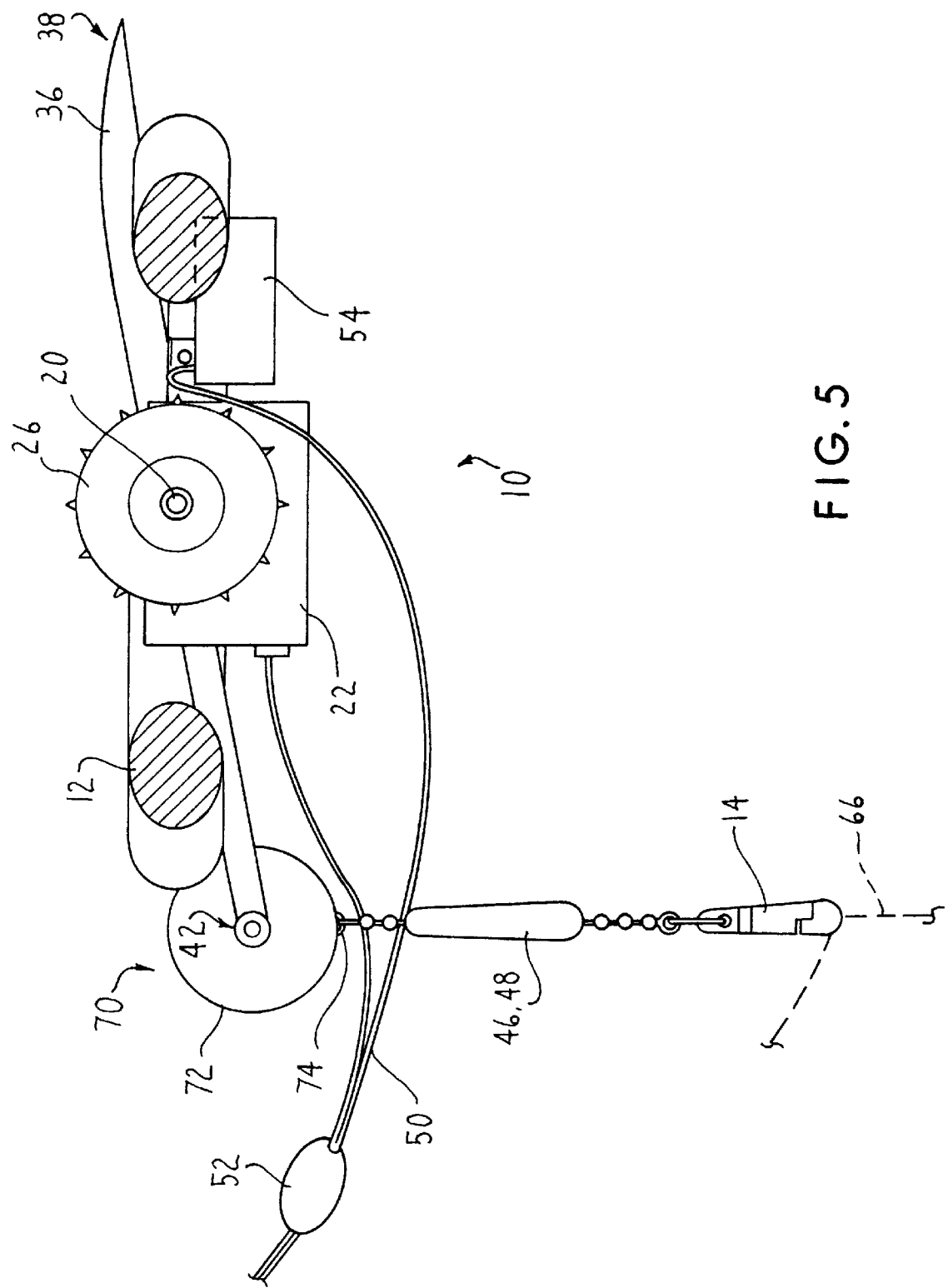
FIG. 5 is the view of FIG. 4, showing an optional depth adjustment feature.

To enhance lure placement when launching the lure placement device 10 from shallow water to fish in deeper water, a down rigger 70 may be added to the device 10 (FIG. 5). The down rigger 70 has a rotatable spool 72 that rotates to feed out and take up a relatively heavy line 74 to lower and raise the coupler 14 relative to the device 10. As is specifically shown, the spool may be mounted on the spacer 40, or may otherwise be incorporated into the lure placement device 10 according to a user's or manufacturer's design preferences. Further, a down rigger drive to actuate the down rigger 70 may be incorporated into the mounting of the spool 72 on the spacer 40, or may be incorporated into the housing of the drive 22, or otherwise included as will be understood by one having ordinary skill in the art. Further, user control may also be incorporated into the control 16.

In use, the fishing line 66 and lure may be set for shallow water fishing with the down rigger line 74 substantially retracted, for example. When the lure placement device 10 is driven into deeper water, the down rigger 70 may be actuated to feed out line 74, lowering the lure 64, according to the user's preferences for fishing the deeper water. One will also appreciate that the down rigger 70 may also be used to position the lure 64 according to information obtained from a fish finder, independent of the water depth.

It will be understood by one having ordinary skill in the art and by those who practice the invention, that various modifications and improvements may be made without departing from the spirit of the disclosed concept. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

I claim:

1. An ice fishing lure transport that delivers a fishing lure to a preselected location that is away from a user and under a layer of ice that is disposed upon a body of water in combination with a fishing lure, the combination comprising:
    a frame;
    a float connected with the frame, the float providing the transport with buoyancy in water, whereby the transport is urged toward and abuts a bottom surface of the ice, when the transport is placed under the ice;
    a motor connected with the frame;
    a propeller operatively connected with the motor, the propeller abutting the bottom surface of the ice in friction engagement, when the transport is placed under the ice,
    a control that is remote from the motor and is operatively connected with the motor, the motor being responsive to the control whereby manipulation of the control by a user actuates the motor;
    a fishing lure coupler connected with the frame; and
    a fishing lure that is releasably coupled with the fishing lure coupler.

2. The combination of claim 1 further including a down rigger that is interconnected between the frame and the coupler, the down rigger being extendible to position the coupler at a predetermined distance below the transport, and the down rigger being retractable to position the coupler adjacent the transport.

3. The combination of claim 2 wherein the propeller is one of a group that includes a wheel and a track.

4. The combination of claim 1 wherein the propeller includes two spaced apart members that abut a bottom surface of the ice in friction engagement, when the transport is under the ice.

5. The combination of claim 4 wherein the motor is operatively connected with each of the two spaced apart members, and wherein the motor independently activates each of the two spaced apart members in forward and backward modes, whereby the transport has skid-steer directional control.

6. The combination of claim 4 wherein the motor is operatively connected with each of the two spaced apart members, and wherein the motor activates of the two spaced apart members in forward and backward modes in unison.

7. The combination of claim 6 wherein the transport further includes a directional tracking member that abuts the bottom surface of the ice in sliding engagement, when the transport is under the ice.

8. The combination of claim 1 wherein the transport further includes a slide member that abuts a bottom surface of a layer of ice in sliding engagement when the transport is under the ice and the transport slides over topographic irregularities of the ice.

9. The combination of claim 1 wherein a tether interconnects the control and the motor and wherein the tether is buoyant in water.

10. The combination of claim 1 wherein the transport further includes a monitor, the monitor being one of a group that includes a depth sounder, a fish finder, a thermometer, and a position locator.

11. An ice fishing lure transport in combination with a fishing lure, the transport delivering the lure to a preselected location that is away from a user and under a layer of ice that is disposed upon a body of water, the combination comprising:
    a frame;
    a float connected with the frame, the float providing the transport with buoyancy in a body of water;
    a drive connected with the frame, the drive abutting a bottom surface of the ice and propelling the device in the body of water, when the transport is placed under the ice;
    a power source operatively connected with the drive;
    a control, the control being remote from the frame, float, and drive, the control being operatively connected with the drive by one of a group of connectors that includes a tether having at least one electrical conductor and a wireless transmitter and receiver system, the drive being responsive to the control, whereby manipulation of the control by the user actuates the drive;
    a fishing lure coupler connected with the frame; and
    a fishing lure that is releasably coupled with the fishing lure coupler.

12. The combination of claim 11 wherein the float is one of a group that includes a member constructed of a closed cell foam material and a member having a hollow chamber.

13. The combination of claim 11 wherein the drive includes a propeller that is one of a group that includes a wheel and a track.

14. The combination of claim 11 wherein the transport further includes a slide member that abuts a bottom surface of a layer of ice in sliding engagement when the transport is under the ice and the transport slides over topographic irregularities of the ice.

15. The combination of claim 11 wherein the tether interconnects the control and the drive and wherein the tether is buoyant in water.

16. The combination of claim 11 wherein the transport further includes a monitor, the monitor being one of a group that includes a depth sounder, a fish finder, a thermometer, and a position locator.

17. An ice fishing lure transport in combination with a fishing lure, the transport delivering the lure to a preselected location that is away from a user and under a layer of ice that is disposed upon a body of water, the combination comprising:

a frame;

a float connected with the frame, the float providing the transport with buoyancy in a body of water;

a drive connected with the frame, the drive propelling the device in the body of water, the drive including two spaced apart members that abut a bottom surface of the layer of ice in friction engagement, when the transport is under the ice;

a power source operatively connected with the drive;

a control, the control being remote from the frame, float, and drive, the control being operatively connected with the drive by one of a group of connectors that includes a tether having at least one electrical conductor and a wireless transmitter and receiver system, the drive being responsive to the control, whereby manipulation of the control by the user actuates the drive;

a fishing lure coupler connected with the frame; and a fishing lure that is releasably coupled with the fishing lure coupler.

18. The combination of claim 17 wherein the drive independently activates each of the two spaced apart members in forward and backward modes, whereby the transport has skid-steer directional control.

19. The combination of claim 17 wherein the drive activates the two spaced apart members in forward and backward modes in unison.

20. The combination of claim 19 wherein the transport further includes a directional tracking member that abuts the bottom surface of the layer of ice in sliding engagement when the transport is under the ice.

* * * * *